US009830299B2

(12) United States Patent
Campney et al.

(10) Patent No.: US 9,830,299 B2
(45) Date of Patent: Nov. 28, 2017

(54) METHOD FOR SELECTING SHAPES IN A GRAPHICAL DISPLAY

(71) Applicant: FISHER-ROSEMOUNT SYSTEMS, INC., Round Rock, TX (US)

(72) Inventors: Bruce Hubert Campney, Pflugerville, TX (US); Stephen G. Hammack, Austin, TX (US); Ken J. Beoughter, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1206 days.

(21) Appl. No.: 13/671,676

(22) Filed: Nov. 8, 2012

(65) Prior Publication Data

US 2013/0131844 A1    May 23, 2013

Related U.S. Application Data

(63) Continuation of application No. 12/579,104, filed on Oct. 14, 2009, now Pat. No. 8,316,313.

(51) Int. Cl.
*G06F 3/048*    (2013.01)
*G06F 15/02*    (2006.01)
*G05B 19/042*   (2006.01)

(52) U.S. Cl.
CPC ..... *G06F 15/0225* (2013.01); *G05B 19/0426* (2013.01); *G05B 2219/23258* (2013.01); *G05B 2219/32128* (2013.01)

(58) Field of Classification Search
CPC .......................... G06F 15/0225; G05B 19/0426
(Continued)

(56) References Cited

U.S. PATENT DOCUMENTS 6,535,883 B1 * 3/2003 Lee ......................... G06F 9/44
                                                    707/694
7,680,546 B2    3/2010 Gilbert et al.
(Continued)

FOREIGN PATENT DOCUMENTS

CN    1542575 A    11/2004
CN    1950764 A    4/2007
(Continued)

OTHER PUBLICATIONS

Examination Report for Application No. GB1017192.4, dated May 28, 2014.
(Continued)

*Primary Examiner* — Andrey Belousov
(74) *Attorney, Agent, or Firm* — Marshall, Gerstein & Borun LLP

(57) ABSTRACT

A selector shape may serve as the background to a configurable composite shape and may include one or more expressions that are evaluated to select between several composite shape definitions via links to the definition. Each selector shape includes an animation expression and a lookup table converter to select an identifier of the composite definition to be loaded and displayed. When the value of the animation expression changes, the value may be matched to the name of a new composite definition using the lookup table, and the new definition may be displayed. The previously-used composite definition may then be marked for removal by a caching system, and removed. These selector shapes also enable the same graphic element to be used in displays designed for different types of display devices, such as display devices having large display screens, standard computer screens and very small display screens.

20 Claims, 11 Drawing Sheets

(58) Field of Classification Search
USPC .............................. 715/762, 763, 771, 837
See application file for complete search history.

(56) References Cited

U.S. PATENT DOCUMENTS

| | | | |
|---|---|---|---|
| 8,060,834 B2 | 11/2011 | Lucas et al. | |
| 8,316,313 B2 | 11/2012 | Campney et al. | |
| 8,407,580 B2* | 3/2013 | Gray .................. | G09B 19/025 |
| | | | 715/219 |
| 2007/0132779 A1* | 6/2007 | Gilbert ............... | G05B 19/0426 |
| | | | 345/619 |

FOREIGN PATENT DOCUMENTS

| | | |
|---|---|---|
| CN | 1950771 A | 4/2007 |
| JP | 08-234951 | 9/1996 |
| JP | 2007-536631 A | 12/2007 |
| JP | 2007-536648 A | 12/2007 |

OTHER PUBLICATIONS

Notice of Reasons for Rejection for Japanese Application No. 2010-229513, dated Jul. 29, 2014.
Examination Report for Application No. GB1017192.4, dated Sep. 5, 2013.
First Office Action for Chinese Application No. 201010589029.X, dated Dec. 10, 2013.
Search Report for Application No. GB1017192.4, dated Feb. 15, 2011.
First Office Action of CN Application No. 201510493035.8 dated Jul. 4, 2017.

* cited by examiner

▽ Properties

| Name | Data Type | Default |
|---|---|---|
| ItemSelector | Expression | Null |
| LookupTable | Table | Null |
| Fixed Aspect Ratio | Bool | True |
| Fixed Width | Bool | True |
| Fixed Hight | Bool | True |
| Size | INT | 500x1000 |
| Scale | INT | 1:1 |
|  |  |  |
|  |  |  |

▽ Item Selector

Expression — 425

DvRT:string//#MOD#/FDISP.CV

MOD# IS THE DEFINITION PROPERTY PASSED TO COMPOSITE DEFINITION

▽ LOOKUPTABLE

| Expression Result | Composite name |
|---|---|
| AI_FP | NewAI_CD |
| Loop_FP | NewLoop_CD |
| ... | ... |
| Not Listed | Data V_Error_Faceplate |
| Expression Error | Data V_Error_Faceplate |
|  |  |
|  |  |

— 435

METHOD FOR SELECTING SHAPES IN A GRAPHICAL DISPLAY

CROSS-REFERENCE TO RELATED APPLICATIONS

This application is a continuation of U.S. application Ser. No. 12/579,104, filed Oct. 14, 2009, the disclosure of which is hereby incorporated herein by reference in its entirety for all purposes.

TECHNICAL FIELD

The present invention relates generally to process plants and, more particularly, to the integration and use of a graphic display editor and graphic display objects of a process control and simulation system to enable the creation of a selector shape that selects between linked composite shapes at runtime to display different information within the selector shape.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been created as part of or to support the specific applications with which they are associated, and thus are generally limited in usefulness to the specific process function for which they were created. For example, it is difficult, if not impossible, to use a graphical program created to support a control or other operator in a maintenance, a configuration or a simulation function.

As a particular example, some process control configuration applications presently include a library of template objects, such as function block template objects and, in some cases, control module template objects, which are used to create a control strategy for a process plant. The template objects have default properties, settings and methods associated therewith and the engineer using a graphical configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. These displays are generally preconfigured to display, in known manners, information or data received from the process control modules or the devices within the process plant. In some systems, displays are created by a graphic depiction that represents a physical or a logical element and that is communicatively tied to the physical or logical element to receive data about the physical or logical element. The graphic on the display screen may change in response to certain events, such as received data to illustrate, for example, that a tank is half full, to illustrate the flow measured by a flow sensor, etc. However, the graphical displays used for configuration, operator control, maintenance and simulation activities are generally created separately from one another using different graphical editors. Still further, the limited graphical capabilities of these displays are hard to implement and are not done so as part of any graphical object.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming and may be fraught with error.

While the control template objects within the control configuration application and the display items within the display creation application are convenient because they can be copied and used to create many different control modules and graphical displays, there is often a need to create numerous of the same control module and graphical display for different equipment within the process plant. For example, many medium to large sized process plants have numerous instances of the same or similar equipment that can be controlled and viewed using the same basic general control module and display. To create these numerous control modules and displays, however, a general control module or display module is created and this general control or display module is then copied for each of the different pieces of equipment for which it is applicable. Of course, after being copied, each of the new control or display modules must be manually altered in the configuration application to specify the particular equipment to which it is attached and all of these control and display modules must then be instantiated and downloaded to the process control system.

To create these numerous control modules and displays, however, a general control module or display module is created and this general control or display module is then copied for each of the different pieces of equipment for which it is applicable. Some techniques for integrating and using a graphic display editor and graphic display elements at a system level of a process control and simulation system may be described in U.S. patent application Ser. No. 10/590, 574 entitled "GRAPHIC SHAPE WITH MULTIPLE VISUALIZATIONS IN A PROCESS CONTROL ENVIRONMENT" filed on Aug. 22, 2006, the entire disclosure of which is hereby incorporated by reference herein. These techniques generally enable the creation and use of composite shapes or composite shapes in various activities associated with plant configuration, control, maintenance, and simulation. The composite shapes are re-useable and re-configurable for any process, simulation, or task within the process control system. For example, U.S. patent application Ser. No. 10/590,574 describes smart graphic elements that are provided for use as portions or components of one or more graphic displays, which may be executed in a process plant to display information to users about the process plant environment, such as the current state of devices within the process plant. Each of the graphic elements is an executable object that includes a property or a variable that may be bound to an associated process entity, like a field device, and that includes multiple visualizations, each of which may be used to graphically depict the associated process entity on a user interface when the graphic element is executed as part of the graphic display. Any of the graphic element visualizations may be used in any particular graphic display and the same graphic display may use different ones of the visualizations at different times. The different visualizations associated with a graphic element make the graphic element more versatile, as they allow the same graphic element to be used in different displays using different graphical styles or norms. These visualizations also enable the same graphic element to be used in displays designed for different types of display devices, such as display devices having large display screens, standard computer screens and very small display screens, such as PDA and telephone display screens.

Each of these re-usable composite shapes is configured at configuration time to display specific data from the control strategies, field devices, and certain physical elements of the process plant. As described above, these shapes may be re-used for many different purposes. For example, a background shape may be re-used with several different foreground shapes. These foreground shapes may each display different data from the process system and plant. A common re-use technique for using a graphical display or a shape for more than one purpose is to include all of the foreground shapes or any other unique, special purpose, or changing part of the composite shape within a single parent composite shape and merely use a Boolean visibility property of the parent composite shape to control which foreground shape is seen at runtime. This method of "stacking" the unique, child shapes within a single parent shape presents several difficulties. For example, it can be difficult to revise this stacked shape within a graphical display editor because only the shapes that are "on top" of the stack can be easily selected. Also, the stacked child shapes may each include an animation that may be continually updated at runtime, even though only one child shape is actually displaying the updated data within the display. The continuous updating and stacked child shapes may add significantly to the computational load at runtime of both the graphical display computer and the controller computer. Further, expressions that determine how animations within the composite shapes are displayed at runtime may include an alias in the expression to permit the same stacked shape to be used in a single graphical display, but using a different path to link the stacked shape to different animations. This requires that not only the stacked shape, but all the associated child shapes be copied, resulting in unneeded duplication. As such, typical displays including stacked composite shapes are likely to be much more of a processing burden than necessary to display the desired information.

SUMMARY OF DISCLOSURE

A selector shape may serve as the background to a faceplate or other configurable composite shape and may include one or more expressions that are evaluated at runtime to select between several composite shape definitions via links to the definition. Each selector shape may include an animation expression and a lookup table converter to select an identifier of the composite definition to be loaded and displayed. When the value of the animation expression changes, the value may be matched to the name of a new composite definition using the lookup table, and the new definition may be displayed. The previously-used composite definition may then be marked for removal by a caching system, and removed.

In some embodiments, a computing device may reduce a number of composite shape sub-elements stored in a runtime memory of a graphical display for the process control system. The device may comprise a processor, a memory, a display, and a composite shape sub-element selection application. The application may be maintained in the memory and executed on the processor to select a composite shape sub-element for display within a composite shape of the graphical display. The composite shape may be configured to include a selector shape, a plurality of composite shape sub-elements, and an expression. The composite shape sub-element selection application may also include instructions for evaluating the expression at runtime to determine an expression result and identifying a composite shape sub-element using the expression result. The composite shape sub-element may be identified from the plurality of composite shape sub-elements. The application may then display the identified composite shape sub-element within or in place of the selector shape and remove any composite shape sub-elements not identified by the expression result from the runtime memory.

In other embodiments, a method or a computer-readable memory having computer-executable instructions may reduce a number of composite shape sub-elements stored in a runtime memory of a graphical display for a process control system. The method or computer-executable instructions may, first, display a composite shape within the graphical display. The composite shape may include a selector shape, a plurality of composite shape sub-elements, and an expression. The method or instructions may also evaluate the expression at runtime to determine an expression result, and identify a composite shape sub-element using the expression result. The composite shape sub-element may be identified from the plurality of composite shape sub-elements. Then, the method or instructions may display the identified composite shape sub-element within or in place of the selector shape, and remove any composite shape sub-elements not identified by the expression result.

BRIEF DESCRIPTION OF THE DRAWINGS

FIG. 6A is a first translation table that may resolve a context expression result to an indicia of a unique composite object;

FIG. 6B is a second translation table that may resolve a context expression result to an indicia of a unique composite object;

FIG. 6C is a third translation table that may resolve a context expression result to an indicia of a unique composite object;

DETAILED DESCRIPTION

Figure 1:
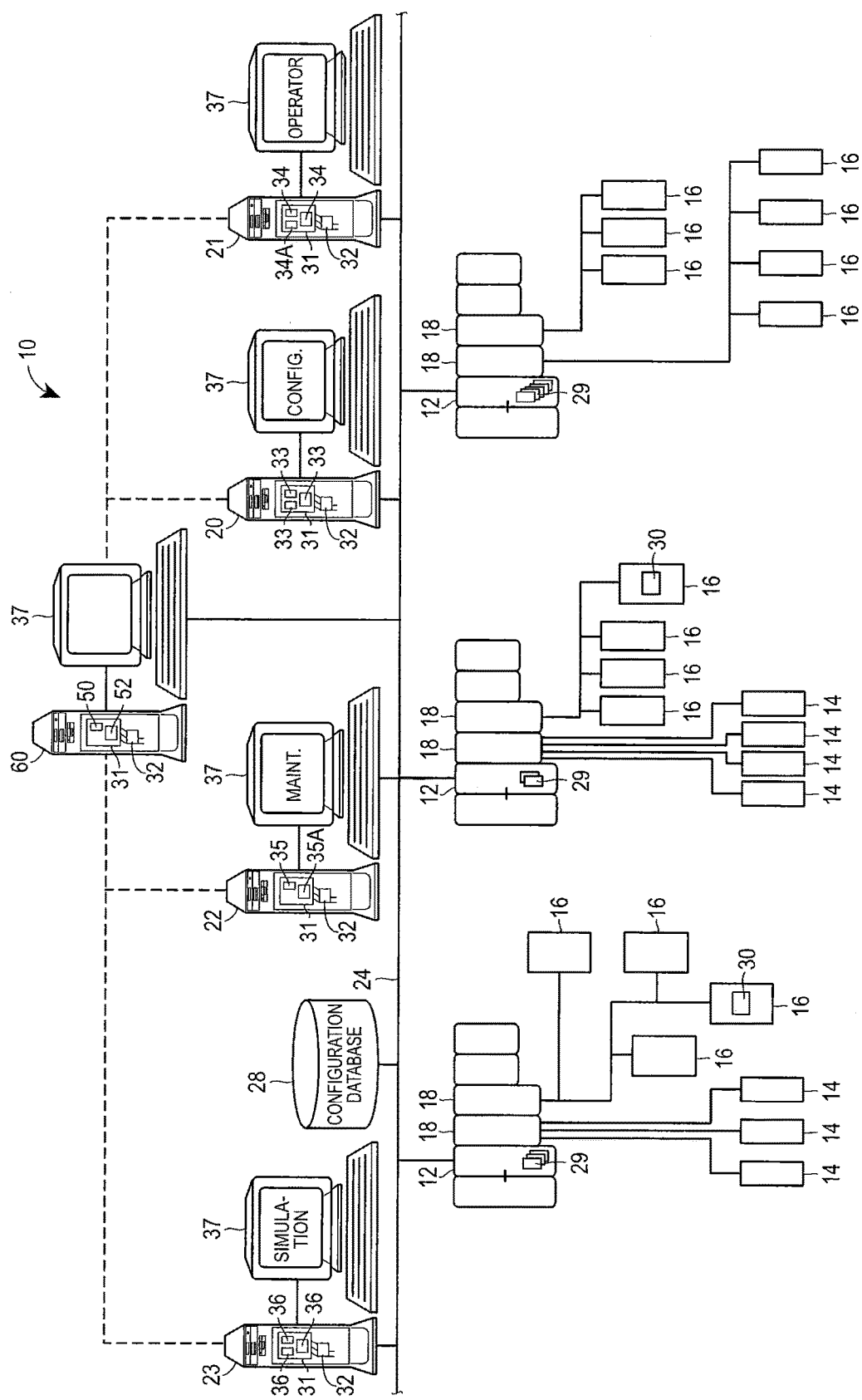
FIG. 1 is a block diagram of a distributed process control network located within a process plant including operator workstations that implement display routines and other applications associated with various functions within the process plant, as well as a workstation that provides system level graphical support that may be used to create graphic display elements and graphic displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link. A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

As described in U.S. patent application Ser. No. 10/590,574, to alleviate the inefficiency of different graphics editors and packages for each plant level, and to provide for more widely usable and understandable graphics within the plant 10, a graphical support layer is provided at a system level of the process plant 10 to support the graphic display and data structure needs of each of the various functional areas of the plant 10, including the configuration, operator viewing, maintenance viewing, simulation and other functional areas of the plant 10. This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function, could be provided as well. The configuration function block 46 implements the configuration routines 33 which interface or communicate with components within the plant operational level 40 to provide control strategies or control modules thereto. The control function block 47 includes the control viewing and other applications 34 and 34*a* which also interface or communicate typically directly with the various physical and logical components within the plant operational level 40 to implement operator initiated changes within the plant 10, to provide information to the operator via control displays 34, to acquire data for the control applications 34*a*, etc. The maintenance function block 48 includes the maintenance routines and applications 35 and 35*a* that interface or communicate with various physical and logical components within the plant operational level 40 to implement maintenance procedures, to collect maintenance data, to provide maintenance data or information to a maintenance person via maintenance displays 35, to run diagnostic applications 35*a*, etc. Likewise, the simulation function block 49 includes simulation routines 36 which implement simulations of the plant 10 and which may be communicatively coupled to components within the plant operational level 40 to obtain data regarding the plant 10.

Figure 2:
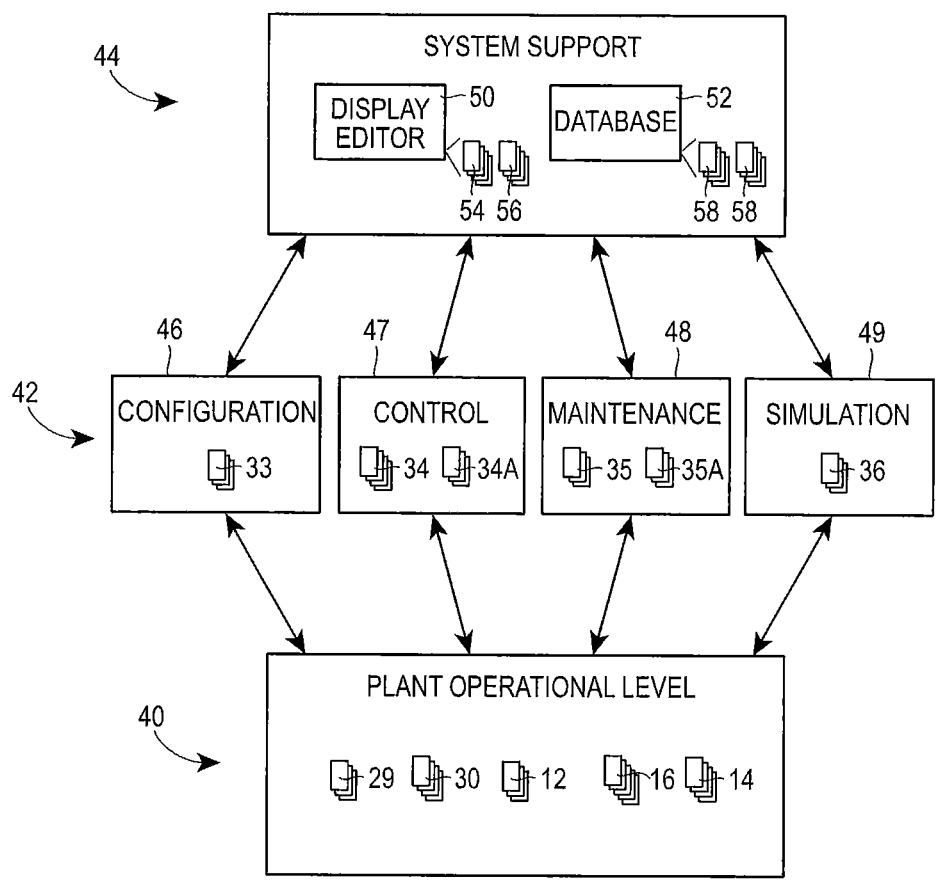
FIG. 2 is a logical block diagram illustrating the integration of system level graphical support within a process plant control, viewing and simulation system.

As illustrated in FIG. 2, the system level support layer 44 ties into and supports each of the function blocks 46-49 within the plant functional layer 42 to enable, for example, the creation and maintenance of common database and display structures, such as software objects, composite shapes and graphic displays for use in the various functional areas 46-49. More particularly, the system level support layer 44 includes application, database and graphical support elements that enable the graphical activities performed in each of the function blocks 46-49 to be integrated together, or to be developed using common database structures and composite shapes created at the system support layer 44.

The system support layer 44 may include a display editor 50 and a graphical object database 52. The display editor 50 may be used to create composite shapes 54 and graphic displays 56, while the graphic object database 52 stores the composite shapes 54 and displays 56 in a memory accessible by the editor 52 and by the various applications in the blocks 46-49. The database 52 may also store other objects 58 such as sub-elements for composite shapes 54, and data structures that connect the composite shapes 54 to individual hardware and software elements within the plant operational level 40. Additionally, the database 52 may store templates, sub-elements, and primitives that may be used to create further composite shapes, or displays. As will be understood from FIG. 2, the graphic display elements 54, displays 56 and other database structures 58 may be used by any and all of the functional blocks 46-49 to create and use graphics associated with those functional blocks.

Generally speaking, the system level support block 44 provides a manner of integrating the graphics used in the process plant 10 of FIG. 1 in all of the functional areas 46-49, to thereby reduce or eliminate the necessity of repeatedly creating different composite shapes for the same plant equipment in different functional contexts, and to make it easy for a user in each of the functional areas 46-49 to tie into data associated with the equipment being displayed in graphical views associated with those functional areas. As will be understood, the system level support layer 44 may be used to provide graphics and database support for multiple applications in each of the functional areas 46-49, for different applications in different ones of the functional areas 46-49, etc.

Referring again to FIG. 1, the system level support block 44 may be implemented using an additional workstation or user interface 60 which may be connected to each of the other workstations 20-23. The workstation 60 may generally store the display editor 50 and database 52 and may store the other elements 54, 56 and 58 if so desired. Additionally, the workstation 60 may be communicatively connected to the workstations 20-23 via the databus 24, via separate wired or wireless communication connections (illustrated by dotted lines in FIG. 1) or in any other desired manner. In the configuration illustrated in FIG. 1, the workstation 60 stores and executes the display editor 50 to enable a user to create composite shapes that include sub-elements and other composite shapes and to group the shapes into one or more graphic displays or display modules. These display modules may be then stored in the database 52 to be accessed and used by various functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the display editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as composite shapes and graphic displays. Composite shapes are generally display objects that are associated with a particular physical entity within the plant, such as a hardware device like a valve, a sensor, a pump, a controller, a tank, a reactor, a burner, a pipe, a pipe fitting, etc. Graphic displays are generally made up of a set of interconnected composite shapes and are used to represent and model more complicated sets of hardware within a plant, such as a unit, an area, etc. and include interconnections between different hardware units. Composite shapes may be made up of a plurality of sub-elements that may, themselves, be composite shapes. In other words, the composite shapes 74 may be nested. For example, a tank composite shape within a reactor graphic display may include one or more composite shapes of valves, pipe fittings, sensors, an agitator, etc., that are each made up of rectangles, ellipses, lines, etc. Likewise, the graphic displays may include one or more composite shapes, as well. Additionally, graphic displays may include graphs, charts and other data provided from the plant, from other applications, such as diagnostic and business applications running in the workstations 20-23 and 60, etc.

Figure 3:
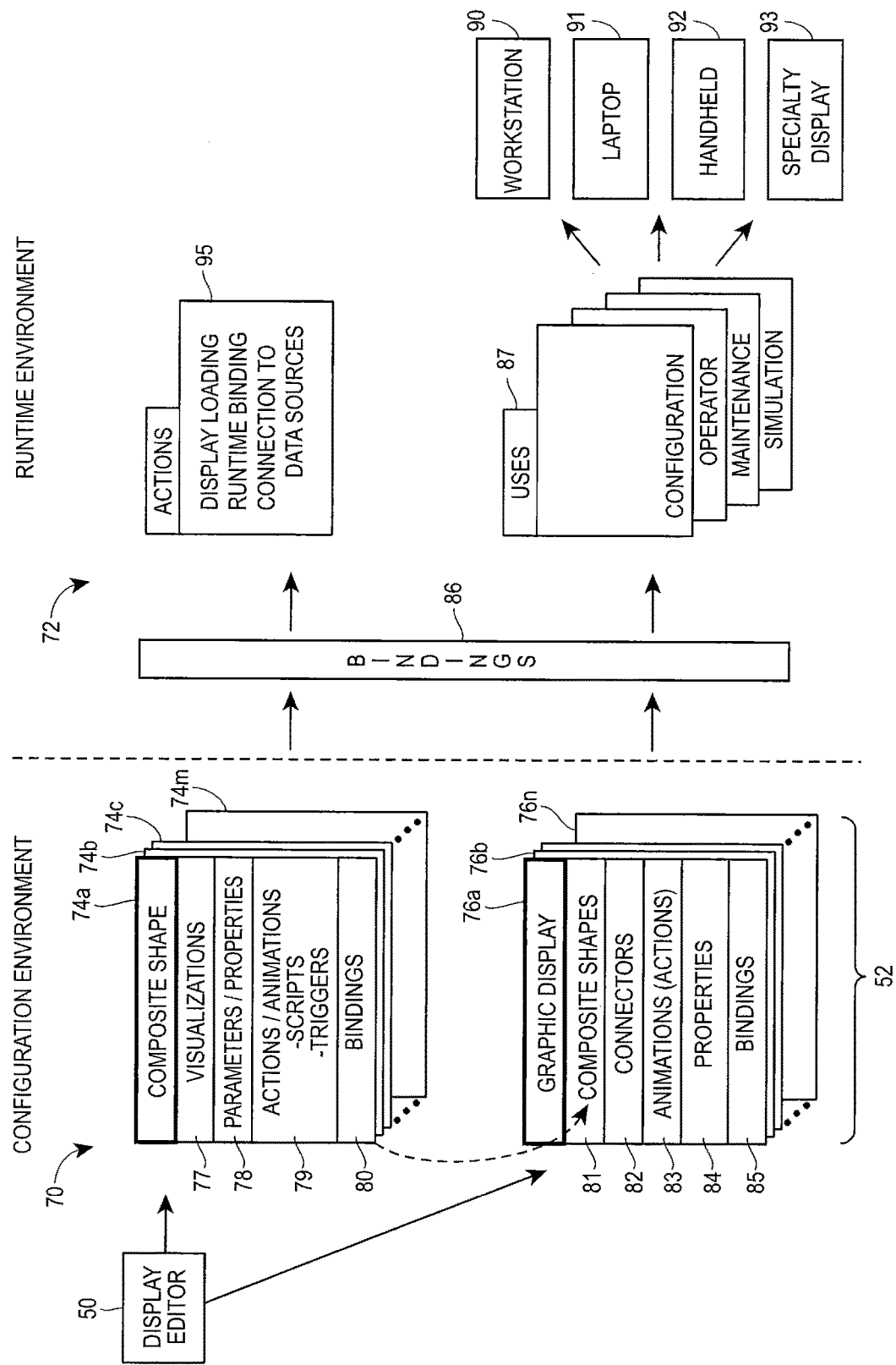
FIG. 3 is a logical diagram illustrating a configuration environment in which graphic elements and displays are created and a runtime environment in which graphic elements and displays may be executed.

FIG. 3 generally illustrates the development and use of composite shapes and graphic displays in two environments in which these elements and displays may exist, in particular, a configuration environment 70 and a runtime environment 72. Generally speaking, display objects in the form of composite shapes 74 (depicted as separate element objects 74a, 74b, etc.) and graphic displays 76 (depicted as separate display objects 76a, 76b, etc.) are created in the configuration environment 70 using, for example, the display editor 50. After being created, the composite shapes 74 and graphic displays 76 may be stored in the database 52. The composite shapes 74 and graphic displays 76 may be created as class objects, referred to herein as display class objects, that define a generic object not bound or tied to specific hardware or logical elements within the process plant 10. However, class objects can be used to create runtime graphical objects having the same basic properties as the class objects, but are tied or bound to specific hardware within the process plant 10. Generally speaking, however, class objects remain tied to the children objects instantiated therefrom, so that changes to the class objects can be automatically propagated to the children objects, even when these children objects are instantiated within a runtime environment.

As illustrated in FIG. 3, each of the composite shapes 74 includes a number of components that make the composite shape useful in many different contexts. In particular, each composite shape 74 includes one or more graphical elements or sub-elements 77, any number of parameters or properties 78, any number of actions or animations 79 which may be implemented using scripts or triggers, and bindings 80. Generally speaking, each element 77, 78, 79, 80 defines the visual properties or elements to be actually displayed on a display screen when the composite shape 74 is implemented in the runtime environment 72. Typically, composite shapes define a graphical representation of a physical or logical device or group of devices, although a composite shape could represent other entities. Composite shapes 74 may be implemented in the runtime environment 72 using any desired description or programming paradigm that defines the specifics of the graphical depiction of an entity. In one embodiment, the composite shapes 74 may be implemented using PGXML, XAML, or Windows Presentation Foundation (WPF—formerly named "Avalon") controls, which are well known controls provided by Microsoft® and which, because they are object-based, are easily implemented in standard Windows® type displays and portable between display environments.

The sub-elements 77 of a composite shape 74 may include basic shapes that are the building blocks of the composite shapes 74. As previously described, the sub-elements may include rectangles, ellipses, curves, lines, and other basic shapes that, when manipulated and combined, form a graphical representation of a tank, valve, pipe fitting, or other object. A sub-element 77 may, itself, be a composite shape 74 to create a complex, nested structure. Therefore, the sub-elements 77 may also include one or more of the parameters/properties 78, actions/animations 79, and bindings 80, as further described below.

Generally speaking, the parameters and properties 78 define variables or other parameters such as static or changeable intrinsic parameters, that are associated with the shape or entity being depicted. These parameters may be definable by the creator of the shape 74. In some embodiments, the parameters are related to how associated sub-elements of the composite shape 74 behave during runtime. Likewise, the actions and animations 79 define routines, programs, or scripts that perform transforms on properties and detect conditions of a process entity based on property values. The animation routine may include any routines that change the graphic visualization or behaviors to be performed on or using the visualization 77 when the visualization 77 is depicted on a display screen. Likewise, animation routines may enable a user to use or interact with the visualization 77 to cause a change in the process, such as a change to an input to the process. These actions and animations provide the visualization 77 with more interesting, understandable or helpful graphical properties and to allow the user to interact with the visualization 77. In one case, these actions or animations may take the form of changes in color, size (e.g., height and width, line size, fonts, etc.) of various components of the visualization, color fills, and animations such as changes in color, rotations, changes in size and scaling, skewing, etc. These actions and animations provide graphical properties as well as user interaction properties to the composite shape 74. The bindings 80, which may be static or fixed bindings or bindings which use aliases, define the manner in which the parameters or properties 78 are to be bound to data, tags or other entities within the runtime environment 72 when the composite shape 74 is implemented as part of a display in the runtime environment 72. Basically, the bindings 80 for each composite shape 74 establish the manner in which the composite shape 74 is tied to one or more entities or data elements defined elsewhere in the plant environment, and thus define an interface between the actual runtime environment 72 and the composite shape 74.

As illustrated in FIG. 3, each of the graphic display objects 76 includes numerous components, such as a reference to or a copy of one or more graphic elements 81, connector elements 82, actions and animations 83, properties 84 and bindings 85. Generally speaking, a graphic display 76 may be a display that depicts the interaction of various graphic elements 81 which may be visually connected together with connector elements 82 representing pipes, lines, conveyor belts, etc. Such connector objects are described in U.S. Pat. No. 7,110,835. A dotted line in FIG. 3 illustrates a reference to one of the composite shapes 74 by the graphic display object 76a. It will be understood that the graphic display 76 that references a composite shape 74 includes all of the properties, parameters, actions and animations, etc. of that composite shape 74. Similar to the composite shapes 74, each graphic display 76 may include one or more additional actions or animations associated therewith that perform, for example, animations on the display, user interface interactions, data manipulations, etc. Likewise, each graphic display 76 may include any number of properties associated with the display, and typically these properties define properties of units, areas, or other groups of elements depicted within the display. Of course, the bindings 85 define the manner in which the graphic display 76 is tied to one or more entities or data elements defined elsewhere in the plant environment and thus define an interface between the actual runtime environment 72 and the graphic display 76.

Once created, the composite shapes 74 and the graphic displays 76 may be bound to and executed in the runtime environment 72 on, for example, any of the workstations 20-23 of FIG. 1. In particular, after a composite shape 74 or a graphic display 76 is created as a class object and is stored in the database 52, that element or display may be instantiated as an actual runtime object and may be executed in the runtime environment 72. As illustrated by the block 86, the instantiation process fills in the bindings defined in the objects 74 and 76, which may be accomplished using one or more resolution tables that may be loaded with proper variable names, tags, aliases etc. within the process plant or process control system to provide a specific connection between actual entities within the process plant and the graphic objects running on a display device within the plant 10. As part of the binding process, the objects 74 and 76 connect to data sources within the process plant as defined by the resolution table, and thereby gain access to the plant so as to be logically and communicatively connected to the process plant 10.

As illustrated by the blocks 87, a display element 74 or a graphic display 76 can be executed in or as part of a number of different functions within the runtime environment 72, including a configuration display, a control operator display, a maintenance display and a simulation display, to name but a few. Additionally, the display objects 74 and 76 may be used in performing system level functions, e.g., ones that use data from various ones of the functional levels depicted in FIG. 2, including for example, predictive control or predictive maintenance functions, system level error detection, diagnostics, etc. In fact, the displays 76, once created in the configuration environment 70 and stored in the database 52 may be used for a number of different activities. Still further, the display objects 74 and 76 may be executed on any desired display or computer hardware, such as a workstation 90, a laptop computer 91, a handheld device 92, like a personal data assistant (PDA), a telephone device, etc., or any other specialty display 93, such as a large screen display having multiple monitors, etc. If desired, a single graphic display 76 may be layered to include one or more views, such as configuration view, an operator view, a maintenance view and a simulation view. Alternatively, separate graphic displays 76 may be configured to provide these separate views using the same or similar graphic elements 81, to provide a consistent look and feel across displays created for these various functions.

As illustrated by the block 95, to be ported to the runtime environment 72, a composite shape 74 or a graphic display 76 may be copied or instantiated, and loaded onto the runtime machine. Generally speaking, it is desirable that the display object 74 or 76 be bound to the runtime environment 72 only when called up or actually executed on a runtime machine, which is referred to herein as runtime binding. That is, the resolution table for each of the instantiated objects is only filled in or bound to the runtime environment when the display object is actually running or being executed in a runtime computer. This procedure assures that the display object including its visualizations, controls, scripts, etc. only executes and thereby uses processing power when the visualization(s) of the object are actually being rendered on a display screen. Thus, the display object is preferably only bound to the runtime environment 72 when that object is actually running on a runtime computer, which means that the display objects 74 and 76 may be intermittently connected to the runtime environment 72 in a manner defined by the activities of the users viewing the visualizations created by these objects. In particular, these objects may be bound to a runtime environment 72 at the times at which they are required to be viewed, and may be unbound or released when not being viewed by a user, such as when a user minimizes or closes a screen in which these objects are providing a visualization.

The display objects 74 and 76 are thus objects which may be created in a stand-alone environment, i.e., the configuration environment 70, but which may be tied or connected with other objects or data structures defined within the process plant environment or any application running within the process plant environment, including, for example, objects, data structures, applications, etc. defined in any control, simulation, maintenance, or configuration environment. Furthermore, once created, the display objects 74 and 76 may be bound to physical or logical process entities directly, via direct references, variables or tags defined a resolution table, or indirectly through the use of alias names, variables and parameters, which may be resolved either when the display object 74 or 76 is downloaded or instantiated within the runtime environment 72, or in some cases, when the display object 74 or 76 is actually running within the runtime environment 72.

The display editor 50 of FIG. 3 may enable the display objects 74 and 76 to be created at various levels of detail, to enhance the ease of use and the versatility of the display objects 74 and 76. For example, composite shapes 74 may be created first to define the properties and operations of more primitive physical and logical entities, and graphic displays 76 may then be created by interconnecting one or more composite shapes 74 to create higher level or more complicated displays depicting more complicated physical or logical entities, or groups of physical or logical entities. Of course, both graphical elements 74 and graphical displays 76 may be stored and accessed in various different categories, to make the creation of higher level display objects more simple to the user.

Figure 4:
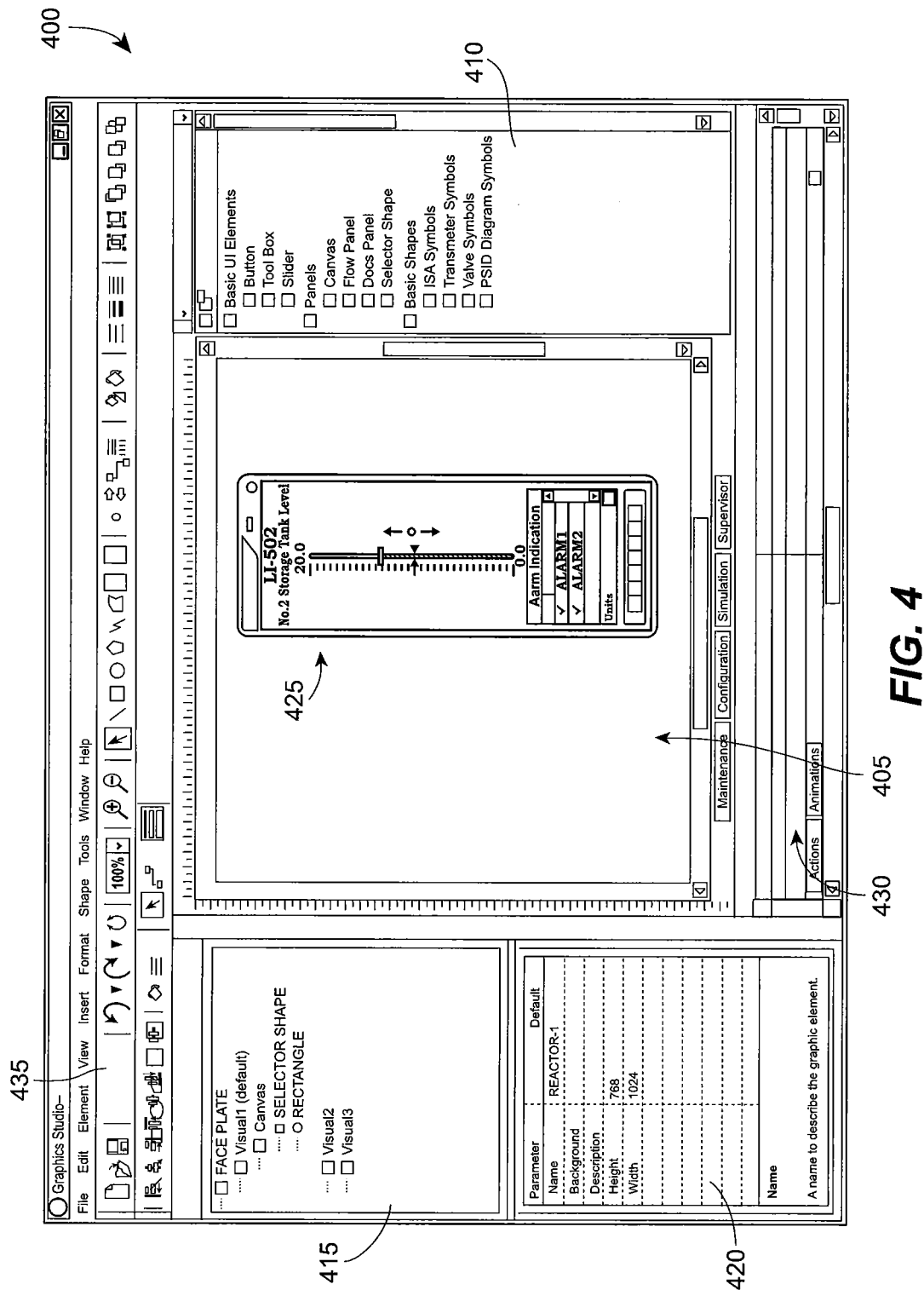
FIG. 4 is a display screen associated with a graphic display editor configured to create a composite shape including one or more configurable selector shapes.

FIG. 4 illustrates an example screen display 400 that may be produced by the display editor 50. The screen display 400 includes a main edit section 405, a palette view 410, a hierarchy view 415 and a property view 420. A first visualization of a faceplate shape 425 is depicted in the main edit section 405. As shown in the hierarchy view, the title of the element is Faceplate and this element includes three visualizations named Visual1 (the default visualization), Visual2 and Visual3. As indicated beneath the Visual1 heading in the hierarchy view 415, the first visualization is made up of a Canvas background which includes a Selector Shape element and a Rectangle. The currently defined properties, in this case a name, a height and a width of the visualization, are listed in the property view 420. When any item is selected in the hierarchy view 420, any of the child primitives or sub-elements associated with the selected item are shown in the edit view 405 and the properties of the currently selected element are displayed in the property view 420.

In the screen 400, the palette view 410 includes a number of basic elements that can be used to create a visualization. For example, the palette view 410 includes a set of basic UI (user interface) elements, such as buttons, text boxes, sliders, knobs, etc., a set of basic panels, and a set of basic shapes. The defined panels may include a Selector Shape which serves as a placeholder to select between various linked composite shapes to display within the selector shape at runtime. Various other panels may be included within the palette 410 such as a Canvas panel which defines an area in which the user can explicitly position elements by coordinates relative to the canvas area, a dock panel which defines an area in which the user can arrange elements either horizontally or vertically relative to one another, and a flow panel which may be used to break, wrap and align its content within a flow panel area with a flow direction indicated. Basic shapes in the palette view 410 may include ISA (Instrument Society of America) symbols, transmitter symbols, valve symbols, PI&D diagram symbols or other control symbols, etc. or any other desired shapes, all of which can be used to build a graphic element. Of course, other basic elements, such as basic control elements, devices, etc. may be provided as primitives in the palette view 410 to be used to create visualizations for a graphic element being defined.

Figure 5:
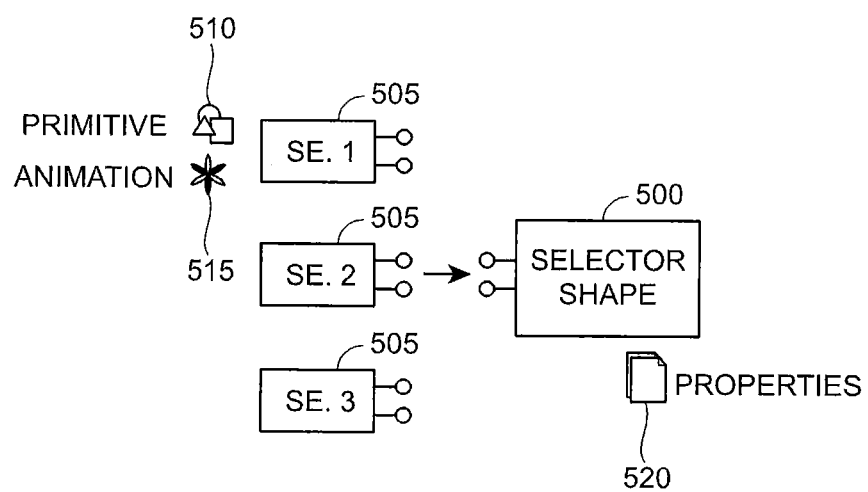
FIG. 5 is a logical block diagram illustrating the integration of unique sub-elements with selector shapes.

As illustrated in FIG. 5, a selector shape 500 may have multiple unique sub-elements 505 or representations associated therewith, it being understood that the different sub-elements 505 may be used at different times or in different displays in which the selector shape 500 is used. Any of the sub-elements 505 may be made up of any number of primitives 510 as well as animations and actions 515. Still further, the selector shape 500 may include any number of properties or parameters 520, which may be tied into or used by the actions and animations 515 to perform changes to the sub-elements 505 and to operate visual triggers associated with the sub-elements 505. Still further, the sub-elements 505 or individual primitives making up a sub-element 505 may have actions defined for predefined events, for example, mouse over events, mouse click events, etc. These actions (which are also referred to as routines) enable event handlers to be set or defined to further customize the behavior of a composite shape and to allow a user to interact with the sub-element 505 to, for example, cause a change within the runtime environment. In particular, the user may interact with the sub-element 505 by entering values or other numbers or information therein, moving an element on the sub-element, such as a slider bar, or by taking some other action to change, for example, a property within the sub-element 505. This property change may be tied, via a script or directly, to a process input, such as a process runtime variable to cause that variable to change. In particular, the property may be connected to a property defined for the graphic element which, in turn, may be bound to a process input. In this manner, a user may interact with the sub-element 505 via an action or animation routine to cause a change or to provide an input to the process or other runtime environment, such as a simulation environment.

As noted above, the properties view 420 of FIG. 4 provides or shows the properties and events defined for the selected item in the hierarchical view 415 and thus for the item depicted in the main edit view 405. A user may toggle among properties, intrinsic properties and events within the properties view 420 using, for example, toolbar buttons. FIG. 6A shows a property view 420A for a selector shape in which the intrinsic properties are shown, in this case including an ItemSelector, LookupTable, FixedAspectRatio, FixedWidth, FixedHeight, Size, and Scale property. The properties view 420A shows the data type of these variables and any default settings for these variables. As noted above, the user can add to, delete from or edit this property list to define properties with any desired data type including enumerations, table structures, etc. If desired, the properties view 420 may also show any runtime bindings defined for these properties and these runtime bindings may be fixed variables or tags or may be tags using aliases that are filled out at runtime or downloading of the graphic element to a runtime machine.

To create and configure a composite shape that includes a selector shape, a user may select and edit the various properties shown in the property view 420A. For example, upon selection of the ItemSelector property, an ItemSelector view 420B (FIG. 6B) may appear within the display editor 50 to allow the user to define the ItemSelector property. In one embodiment, the ItemSelector property is a context expression that, when evaluated, determines which graphic object is displayed within or in place of the selector shape. For example, the context expression 425 may include one or more user-configurable parameters that identify the sub-element 505 to be displayed within or replace the selector shape. The expression 425 may also include additional default or user-configurable parameters that determine how the sub-element 505 is displayed within or in place of the selector shape. Some of these additional parameters may include sub-element colors, text formatting, bindings or links to process parameters and field device data for display within the sub-element 505, etc.

Upon selection of the LookupTable property, a LookupTable view 420C may appear within the graphical editor to allow the user to define the LookupTable property. In some embodiments, the LookupTable property is a data structure such as an array or associative array that may be used to perform an array indexing operation by matching the result of the expression 425 (FIG. 6B) to a name or other item in the data structure to identify a sub-element 505 to be displayed within or in place of the selector shape. The LookupTable property may also be used to validate any of the expression values by matching against a list of valid (or invalid) items in the data structure and may include pointer functions (or offsets to labels) to process the matching input expression result. As illustrated by FIG. 6C, the one or more entries in the LookupTable may include an expression result 430 and a composite name 435. The expression result entry may correspond to a result of evaluating the expression 425 as described above, and the composite name may correspond to an identification (e.g., a name, a path, a link, a binding, etc.) of a sub-element 505 composite shape to be displayed within or in place of the selector shape, as described above. The LookupTable property may also include default entries such as "NotListed" and "Expression Error" to manage errors resulting from the expression result not being present within the table 420C, an error occurring during the expression evaluation, or the expression result corresponding to a sub-element 505 that is not found, incorrect, or otherwise in error. Such an error result may correspond to a composite name 435 of a general, default sub-element 505, an error sub-element 505, or any other standard sub-element 505 that may communicate the presence of an error when the expression 425 is evaluated and the expression result compared to the LookupTable property.

To configure the LookupTable 420C, the user may enter a value in the Expression Result 430 column of the LookupTable view 420C, for example "AI_FP." The user may then select a composite shape class and link it to the value entered in the Expression Result 430 column. In some embodiments, the user selects a composite shape or class of composite shapes from the palette view 410 (FIG. 4) and places the selected item into the LookupTable view 420C using a "drag and drop" method. Upon dropping the selected item near the Expression Result 430 column entry, the corresponding Composite Name 435 entry may automatically populate with an image, text, or other representation of the name, binding, path, or other identifying characteristic of the selected item. Additionally or alternatively, the user may manually enter the Composite Name 435 into the field corresponding to the entered Expression Result 430. The user may repeat the same process for each selector shape within a composite shape and any nested selector shapes, as well.

Figure 7:
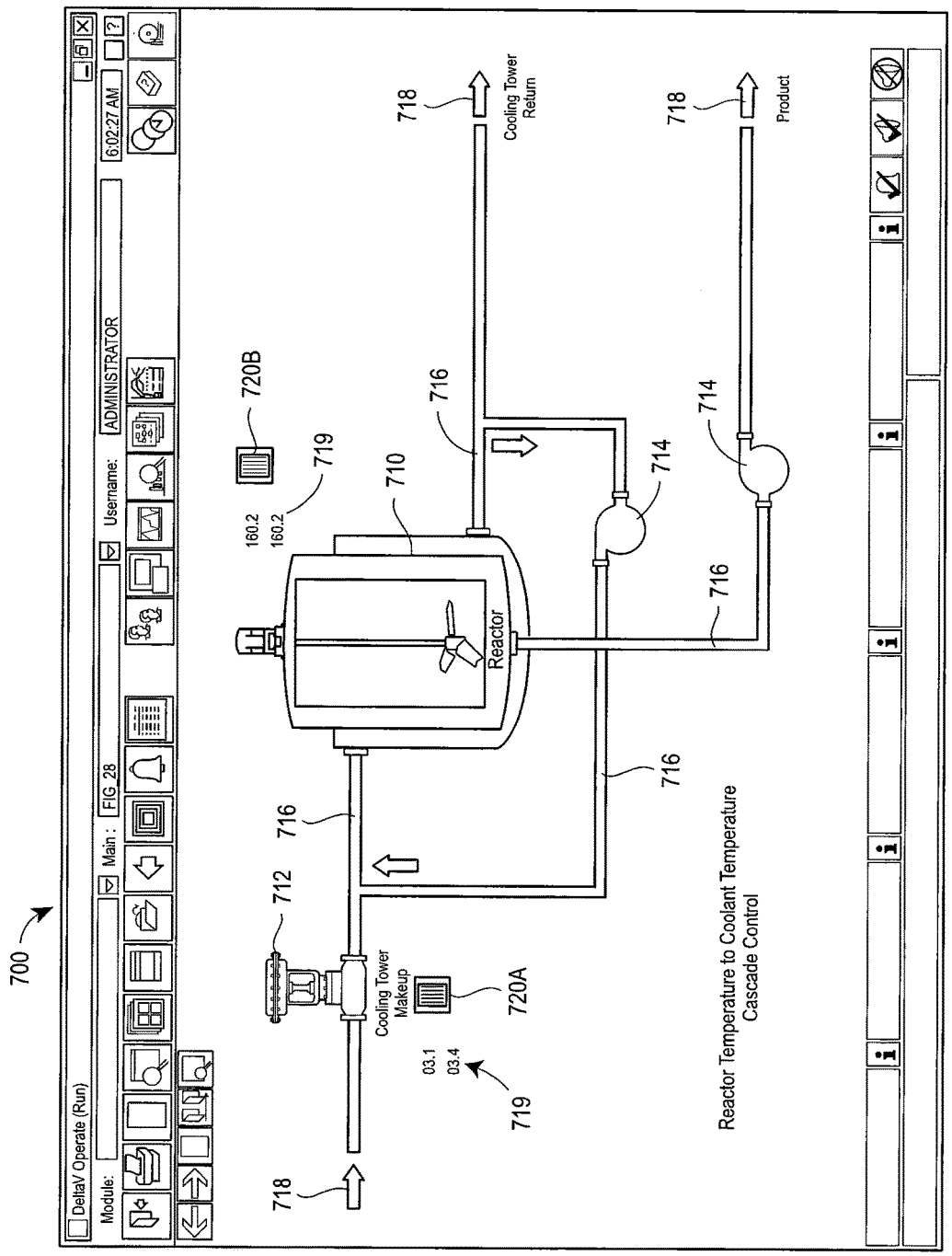
FIG. 7 is a logical diagram illustrating a runtime selection of a display screen associated with a graphic display made up of various interconnected graphic elements and connectors.

FIG. 7 illustrates a display screen 700 of an example graphic display, in the form of a control operator display at runtime, that may be created using the display editor 50 at configuration time. The display screen 700 includes a reactor element 710 connected to a valve element 712 and to one or more pump elements 714 via connector elements 716, which are in this case fluid flow lines. Fluid flow or stream elements 718 provide references to the streams of materials coming in and leaving the section of the plant depicted by the screen 700. The graphics within the display screen 700 may be created by selecting and interconnecting various graphic elements together, and thus the display screen 700 may include high resolution graphics, animations, actions, visual triggers, with respect to individual graphic elements. In this manner, animation and user actions may be incorporated into the graphic display. For example, using this capability, static graphic components for process equipment may be modified to indicate the status of the equipment, (e.g. if a motor is on or is tripped, the operating condition or position of a valve, etc), animation may be used to represent dynamic data associated with the equipment, (e.g., the level of a tank being filled using a filling technique), or the status of an agitator through display changes (animations) that indicate motion. Further, as described above, a composite shape including one or more selector shapes as described above may be used to reduce the computational load of the runtime display of the graphic components, animations, and other elements. Each composite shape that includes the replaceable functionality described above may allow for runtime selection of that shape's specific graphic representation. This runtime selection may result in significantly fewer objects that are present within the graphic display at runtime due to the typical method of "stacking" all possible shapes within the display as previously described. In particular, the replaceable functionality may allow fewer library objects because those that are very similar do not need to be an entirely whole new object, but may be a variation on a basic set of shapes.

While this replaceable functionality using the selector shapes described above may be implemented in any composite shape that includes one or more replaceable portions, one possible use and display of the selector shapes enables a user to interface with the display 700 in a manner that allows the user to view additional information or to take actions with respect to the runtime environment via the interaction with the display screen 700. In some cases, these interactions may be implemented with mouse-overs and other actions with respect to graphic elements. For example, the button 720A may provide the user with a further view of information about the cooling tower makeup, while the button 720B may provide a faceplate display for the reactor 710. Thus, while the display 700 includes a set of elements that illustrates the pieces of equipment that make up a process or a part of a process using three-dimensional components, which may be based on graphics imported from a number of different sources including, for example, In-Tools, Auto-Cad, Windows metafiles such as Visio, vector drawings, JPEG and bitmap image formats, the screen 700 may also include animations to perform, for example, rotations, sizing, scaling, skewing, color changing, etc. at the element level to provide more interesting and realistic animations, and therefore more understandable displays.

Figure 8:
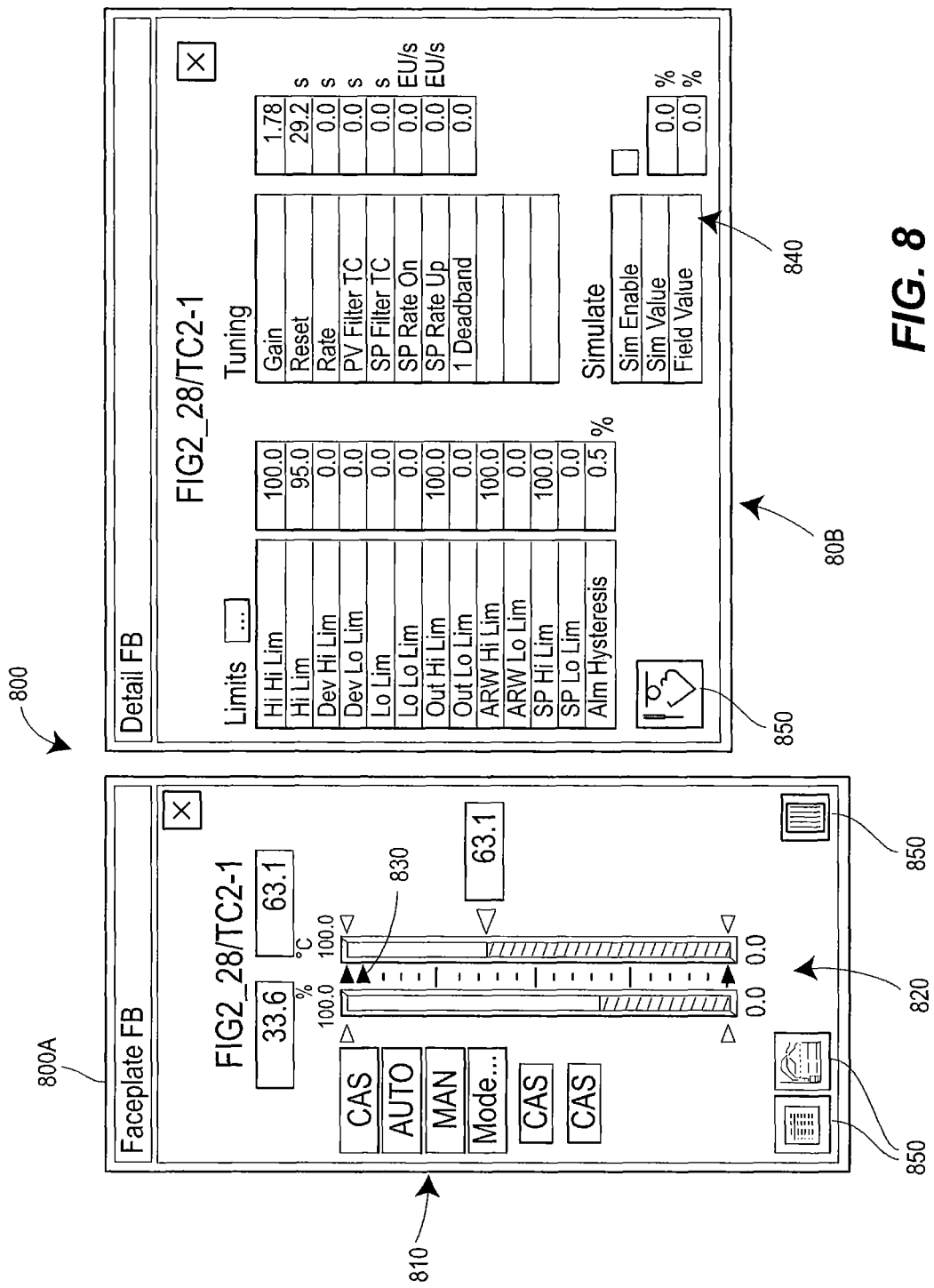
FIG. 8 is a set of graphic display screens that may be accessed via the graphic display of FIG. 7 to show a control panel and a faceplate for an element within the display of FIG. 7.

One example use of selector shapes may occur when an operator accesses a user interactive component from the display screen 700. A script or other program may pull up a further screen or display, such as a faceplate display or control panel display, examples of which are illustrated in FIG. 8. For example, and as further explained with reference to FIGS. 9-11 below, when a user interface button, such as the button 720B shown in the screen 700 is accessed, a faceplate for the reactor 710 may be presented to the operator, and the operator may then use this faceplate to modify or view details about the reactor 710. Each faceplate may include a selector shape or other object defining a configurable expression, as described above. Upon selection of a user interface button such as button 720B, the expression is evaluated to determine what unique information to display within or in place of the selector shape.

In the example of FIG. 8, the faceplate information 800 is associated with a control loop (named FIG2_28/TC2-1) for the reactor 710 which the user may access via the button 720A in the screen 700. Using the portion 800A of the faceplate 800, may view the current values of the operating parameters on the slider shapes 820, may change a set-point associated with control loop using an arrow 830, etc. Additionally, the user may be provided with information on the limits and tuning parameters of the control loop in the display section 800B and may enable simulation capabilities in the section 840. If desired, the section 800B may be obtained from the view of the section 800A by selecting one of the buttons 850 on the section 800A. Likewise, the user may access still further information about the control loop, such as trend data, diagnostic data, etc., or may access and run control and diagnostic programs such as loop tuning programs via the other buttons 850. Thus, any other activities, screens, and actions may be accessed via the display 700 in response to user actions taken or allowed on the screen 700.

Where the control system supports the use of aliases in the definition of similar pieces of equipment, the dynamic display components may also be designed to support dynamic referencing based on the piece of equipment selected in the display screen 400. In such cases, preconfigured aliases and attributes may be used in place of an object tag or graphical attributes normally defined as part of a display object. This aliasing capability supports a high degree of flexibility and re-usability, because similar display objects may connect to different I/O points and represent different graphical attributes, appearances, and security. Such capability may eliminate the need to re-build similar display objects or similar displays for different pieces of replicated equipment within a plant. In this manner, the same graphic display may be used to view different hardware units that are the same in makeup and usage within a plant.

Figure 9:
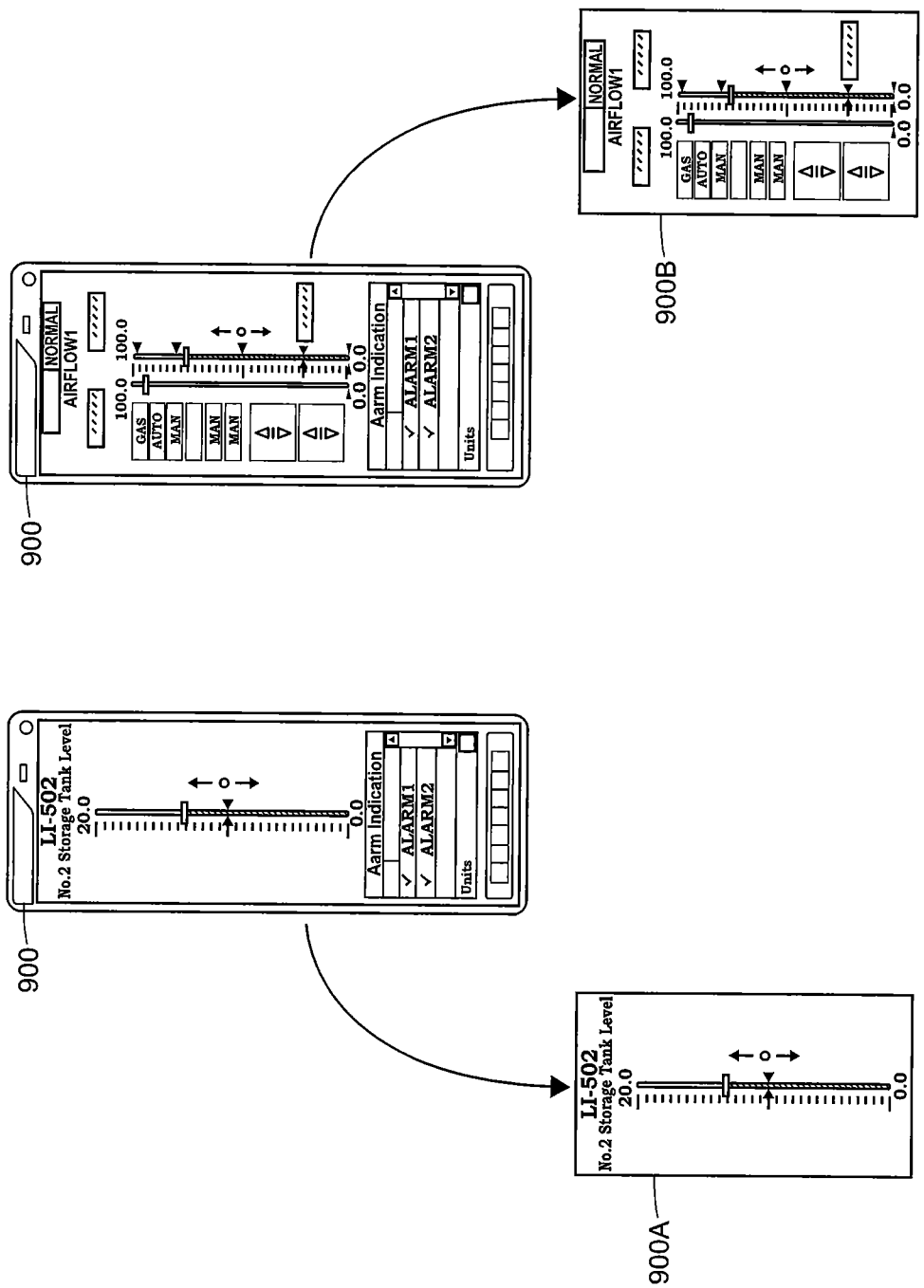
FIG. 9 is a diagram of the relationship between a composite shape that includes a selector shape and unique sub elements.

With reference to FIG. 9, one example of a composite shape including the replaceable functionality described above is a faceplate object 900. At runtime, and depending on the configuration of the object 900 (e.g., the expression for the selector shape) at configuration time, the object 900 may display a different composite shape or sub-element of the object 900 (e.g., either composite shape 900A or composite shape 900B) within or in place of a selector shape sub-element of the object 900. Thus, only the needed sub-element objects 900A, 900B, etc, that are actually visible within the graphic display 700 (FIG. 7) or may be visible upon selection of another object (e.g., the faceplate objects 900 of FIG. 9) may be instantiated with the larger graphic display. Instantiating only the needed composite shapes and sub-elements may greatly reduce the computational load of the graphical display 700 at runtime.

Figure 10:
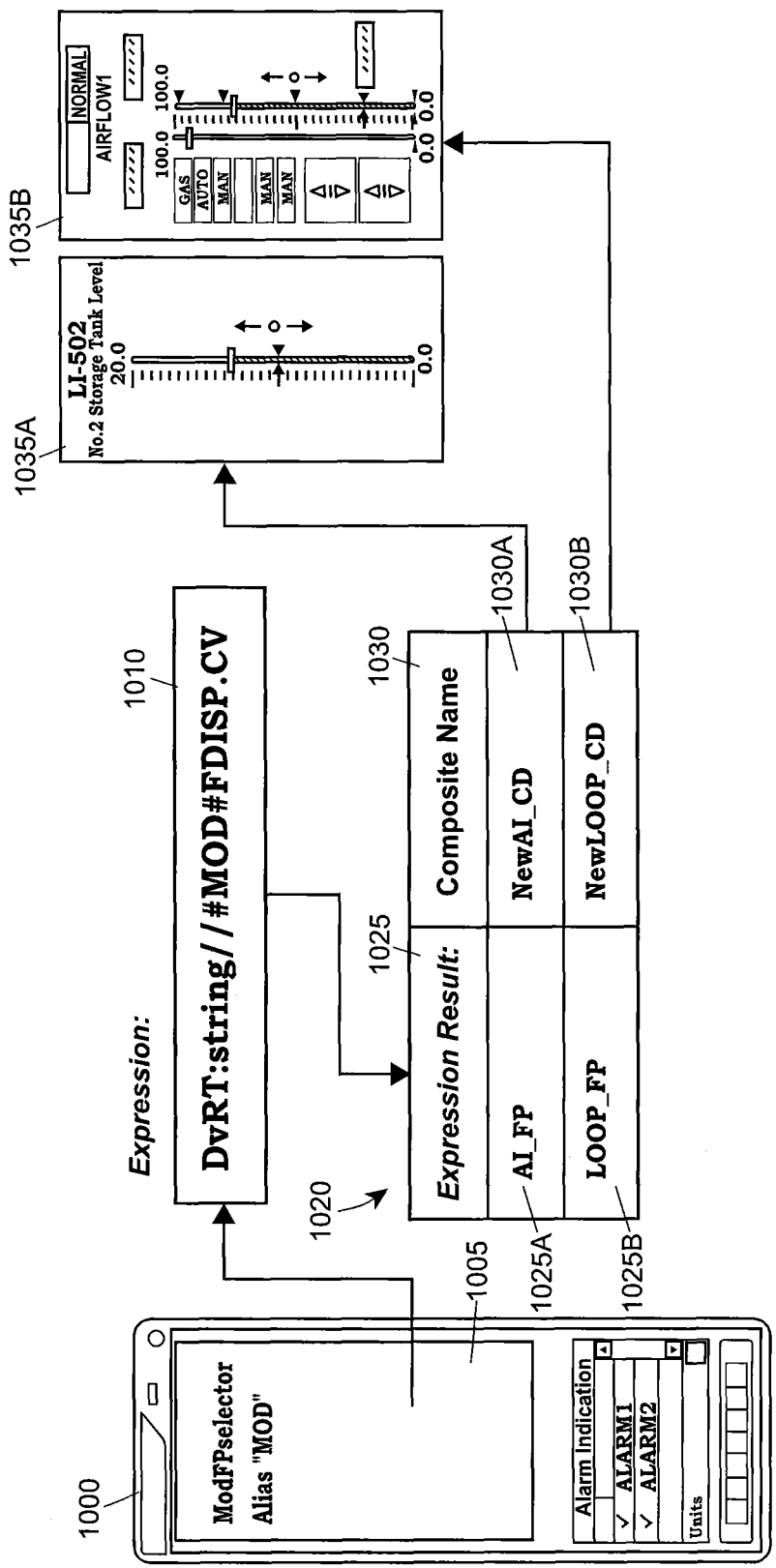
FIG. 10 is a logical diagram illustrating the runtime resolution of a context expression to a unique composite object to display that unique composite object within a selector shape corresponding to the context expression.
Figure 11:
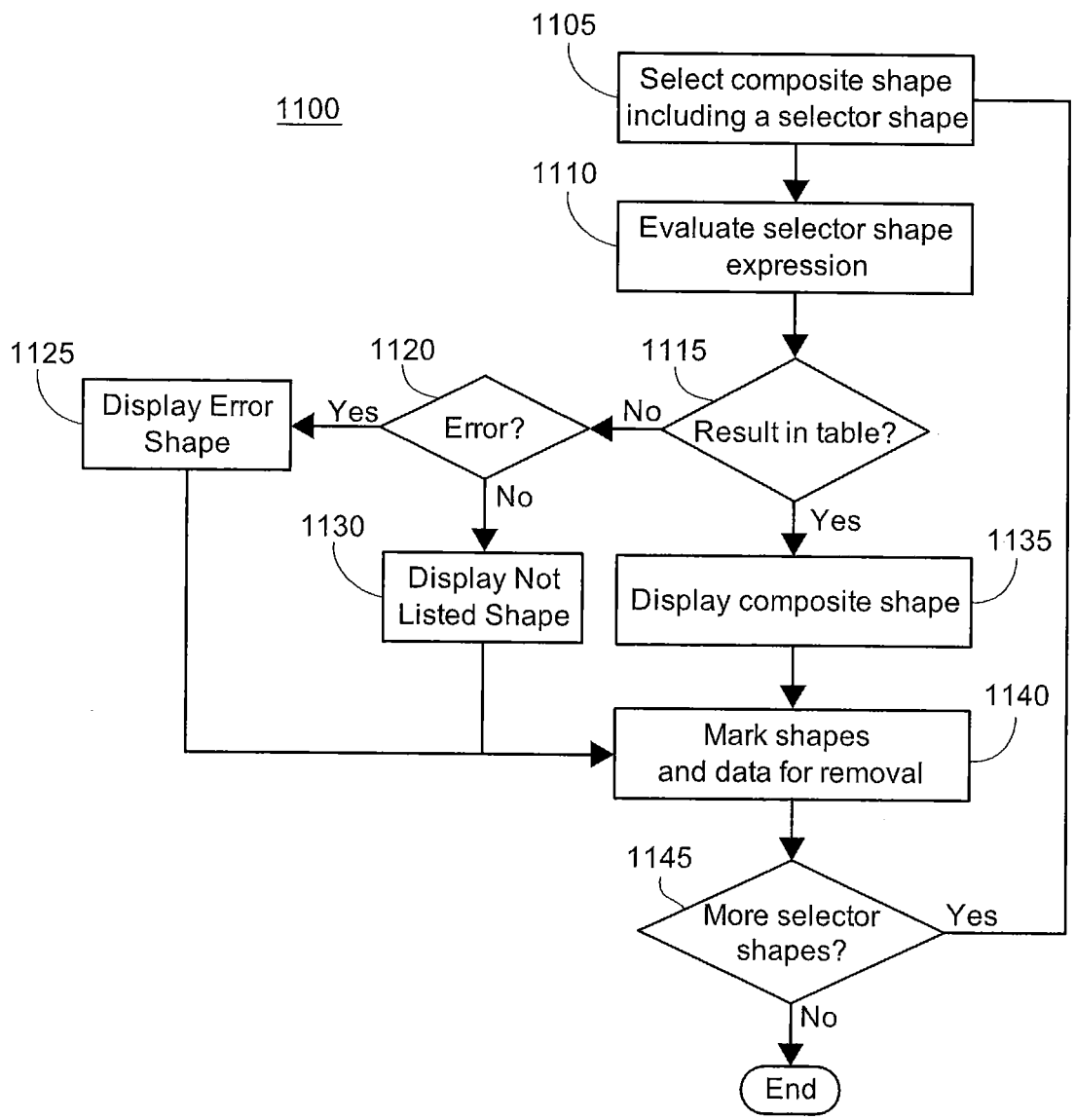
FIG. 11 is a logical diagram of a method for selecting composite shapes within a graphical display.

In one embodiment, and with reference to FIG. 10, each composite shape 1000 that includes the replaceable functionality may include one or more selector shapes 1005 that each include one or more context expressions 1010 (similar to the context expression 425, described above), and lookup tables 1020 (similar to the LookupTable view 420C, described above). At runtime, each context expression 1010 is evaluated to determine an expression result 1025. The expression result 1025 may then be matched to an identifier corresponding to another composite shape, for example, a composite shape name 1030. For example, evaluation of the context expression 1010 may result in either a first expression result 1025A that matches a first composite name 1030A or the expression 1010 may evaluate to a second expression result 1025B corresponding to a second composite name 1030B. Each of the identifiers or composite names 1030A, 1030B may correspond to a unique sub-element 1035A and 1035B, respectively, that, once the context expression is evaluated, is displayed within or in place of the selector shape 1005 of the composite shape 1000. Of course, each unique sub-element 1035A, 1035B may also include a selector shape similar to selector shape 1005 that includes one or more context expressions like context expression 1010 that may be, in turn, each evaluated to display a unique sub-element like unique sub elements 1035A and 1035B (i.e., the selector shapes may be nested).

With reference to FIGS. 7-11, a method 1100 may be executed at runtime using a configured graphical display 700 (FIG. 7) and selector shape to select a composite shape and reduce the runtime computational load by eliminating "stacking" unneeded sub-elements within composite shapes. The method 1100 may include one or more routines in the form of computer-executable instructions that are stored in a computer-readable memory and executed at runtime using a processor of a computing device. For example, routine 1105 may select a composite shape from a configured graphical display 700 that includes a selector shape. In one embodiment, selecting the button 720B may provide a faceplate display for the reactor 710 that includes a selector shape 1005. At routine 1110, a selector shape expression 1010 may be evaluated to determine an expression result 1025. For example, the selector shape expression 1010 may evaluate to AI_FP (1025A). At routine 1115, the method 1100 may determine if the expression result 1025 from the evaluated selector shape expression 1010 corresponds to any expression result 1025 of the lookup table 1020. The method 1100 may determine that the expression result 1025 was not present in the lookup table due to an error in the expression 1010 itself which makes evaluation at block 1110 impossible. At routine 1120, if the expression result is an error, then the method 1100 may display an Error composite shape within or in place of the selector shape at routine 1125. The Error shape may include text or some other identifying characteristic to indicate that the expression evaluation of routine 1110 resulted in an error. Alternatively, if the expression evaluation of routine 1110 does not result in an error, but the expression result cannot be found in the lookup table, then the method 1100 may display a Not Listed composite shape within or in place of the selector shape at routine 1130 to indicate that no composite shape corresponds to the expression result. Like the Error composite shape of routine 1125, the Not Listed composite shape may include text or other indication that the expression result from the expression evaluation routine 1110 does not correspond to any other composite shape. Returning to routine 1115, if the expression evaluation of routine 1110 is found in the lookup table 720, and corresponds to a composite name 730, then the composite shape corresponding to that expression result and composite name may be displayed within or in place of the selector shape. For example, the selector shape expression 1010 may evaluate to AI_FP (1025A) which, according to the lookup table 1020, corresponds to a composite shape having the name NewAI_CD (1030A) and sub-element composite shape 1035A. Sub-element composite shape 1035A is then displayed within or in place of selector shape 1005. At routine 1140, once the composite shape 1000 displays the sub-element composite shape (1035A or 1035B, etc.), the previous definition for the composite shape 1000 that included sub-elements that were not visible at runtime through the selector shape 1005 as well as all data needed to display those extra shapes may be marked for removal. In some embodiments, the shapes and data not specified by the selector shape 1005 and expression 1010 may be removed by a caching system of a computer system using the graphical display 700 display editor 50 or other system. At routine 1145, if more selector shapes and expressions exist within the shapes of the graphic display 700, then the method 1100 may return to routine 1105 to repeat the routines described above. If no more selector shapes are present in the display 700, then the method 1100 may end.

When implemented, any of the software and routines described herein may be computer executable instructions stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computing device for reducing a number of composite shape sub-elements stored in a runtime memory of a graphical display for the process control system, the device comprising:
   a processor;
   a memory;
   a display; and
   a composite shape sub-element selection application maintained in the memory and executed on the processor to select a composite shape sub-element for display within a composite shape of the graphical display, the composite shape configured to include a plurality of composite shape sub-elements and an expression, the composite shape sub-element selection application including instructions for:
evaluating the expression to determine an expression result associated with a change to a context; and
in response to and based upon the change to the context associated with the determined expression result:
executing an operation to identify a composite shape sub-element using the expression result by matching the expression result to an item that identifies the composite shape sub-element from the plurality of composite shape sub-elements;
displaying the identified composite shape sub-element within the composite shape; and
removing any composite shape sub-elements not identified by the expression result.

2. The computing device of claim 1, wherein each of the composite shape sub-elements include one or more of a primitive, an animation, and an action.

3. The computing device of claim 2, wherein each action and animation includes one or more parameters to perform changes to the composite shape sub-element and to operate a visual trigger associated with the sub-element.

4. The computing device of claim 1, wherein the expression includes one or more user-configurable parameters that identify the composite shape sub-element.

5. The computing device of claim 4, wherein the one or more user-configurable parameters include additional user-configurable parameters that determine how the identified composite shape sub-element is displayed within the composite shape, the additional user-configurable parameters including one or more of a sub-element color, a sub-element text format, a sub-element binding, and link to process parameter and field device data.

6. The computing device of claim 1, wherein identifying the composite shape sub-element using the expression result includes an array indexing operation that matches the expression result to an item that identifies the composite shape sub-element.

7. The computing device of claim 1, wherein the expression includes a value and the instructions further comprise validating the expression value by matching the value against a valid value.

8. The computing device of claim 1, wherein if the expression result includes an error or if a missing composite shape sub-element is identified using the expression result, the displayed composite shape sub-element includes a default sub-element or an error sub-element.

9. The computing device of claim 1, wherein removing any composite shape sub-elements not identified by the expression result includes marking the unidentified composite shape sub-elements for removal from the runtime memory of the graphical display for the process control system.

10. The computing device of claim 1, wherein the composite shape is further configured to include a selector shape and displaying the identified composite shape sub-element within the composite shape includes displaying the identified composite shape sub-element within or in place of the selector shape.

11. A method for reducing a number of composite shape sub-elements stored in a runtime memory of a graphical display for a process control system, the method comprising:
displaying a composite shape within the graphical display, the composite shape including a plurality of composite shape sub-elements and an expression;
evaluating the expression at runtime to determine an expression result associated with a change to a context; and
in response to and based upon the change to the context associated with the determined expression result:
executing an operation to identify a composite shape sub-element using the expression result by matching the expression result to an item that identifies the composite shape sub-element from the plurality of composite shape sub-elements;
displaying the identified composite shape sub-element within the composite shape; and
removing any composite shape sub-elements from the composite shape not identified by the expression result.

12. The method of claim 11, wherein each of the composite shape sub-elements include one or more of a primitive, an animation, and an action, wherein each action and animation includes one or more parameters to perform changes to the composite shape sub-element and to operate a visual trigger associated with the sub-element.

13. The method of claim 11, wherein the expression includes one or more user-configurable parameters that identify the composite shape sub-element, the one or more user-configurable parameters include additional user-configurable parameters that determine how the identified composite shape sub-element is displayed within the composite shape, and the additional user-configurable parameters include one or more of a sub-element color, a sub-element text format, a sub-element binding, and a link to process parameter and field device data.

14. The method of claim 11, wherein identifying the composite shape sub-element using the expression result includes an array indexing operation that matches the expression result to an item that identifies the composite shape sub-element.

15. The method of claim 11, wherein the composite shape further includes a selector shape and displaying the identified composite shape sub-element within the composite shape includes displaying the identified composite shape sub-element within or in place of the selector shape.

16. A computer-readable memory having computer-executable instructions for performing steps to reduce a number of composite shape sub-elements stored in a runtime memory of a process control system, comprising:
displaying a composite shape within the graphical display, the composite shape including a plurality of composite shape sub-elements and an expression;
evaluating the expression at runtime to determine an expression result associated with a change to a context; and
in response to and based upon the change to the context associated with the determined expression result:
executing an operation to identify a composite shape sub-element using the expression result by matching the expression result to an item that identifies the composite shape sub-element from the plurality of composite shape sub-elements;
displaying the identified composite shape sub-element within the composite shape; and
removing any composite shape sub-elements from the composite shape not identified by the expression result.

17. The computer-readable memory of claim 16, wherein each of the composite shape sub-elements include one or more of a primitive, an animation, and an action, and each action and animation includes one or more parameters to perform changes to the composite shape sub-element and to operate a visual trigger associated with the sub-element.

18. The computer-readable memory of claim 16, wherein the expression includes one or more user-configurable parameters that identify the composite shape sub-element, the one or more user-configurable parameters include additional user-configurable parameters that determine how the identified composite shape sub-element is displayed within or in place of the selector shape, and the additional user-configurable parameters include one or more of a sub-element color, a sub-element text format, a sub-element binding, and a link to process parameter and field device data.

19. The computer-readable memory of claim 16, wherein identifying the composite shape sub-element using the expression result includes an array indexing operation that matches the expression result to an item that identifies the composite shape sub-element.

20. The computer-readable memory of claim 16, wherein the composite shape further includes a selector shape and displaying the identified composite shape sub-element within the composite shape includes displaying the identified composite shape sub-element within or in place of the selector shape.

* * * * *